(12) United States Patent
Shah

(10) Patent No.: US 7,145,317 B1
(45) Date of Patent: Dec. 5, 2006

(54) CONSTANT FREQUENCY DUTY CYCLE INDEPENDENT SYNTHETIC RIPPLE REGULATOR

(75) Inventor: Mehul D. Shah, Morrisville, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 11/269,454

(22) Filed: Nov. 8, 2005

Related U.S. Application Data

(60) Provisional application No. 60/635,690, filed on Dec. 13, 2004.

(51) Int. Cl.
*G05F 1/62* (2006.01)

(52) U.S. Cl. ....................................... 323/288

(58) Field of Classification Search ........ 323/222–225, 323/271, 282, 284, 285, 351
See application file for complete search history.

(56) References Cited

U.S. PATENT DOCUMENTS

| | | | |
|---|---|---|---|
| 6,583,610 B1 * | 6/2003 | Groom et al. ............... | 323/288 |
| 6,791,306 B1 * | 9/2004 | Walters et al. ............... | 323/288 |
| 6,828,766 B1 * | 12/2004 | Corva et al. ................. | 323/284 |
| 6,894,471 B1 * | 5/2005 | Corva et al. ................. | 323/282 |
| 7,019,504 B1 * | 3/2006 | Pullen et al. ............... | 323/283 |
| 2005/0017703 A1 * | 1/2005 | Walters et al. ............... | 323/288 |

* cited by examiner

*Primary Examiner*—Gary L Laxton
(74) *Attorney, Agent, or Firm*—Gary R. Stanford

(57) ABSTRACT

A synthetic ripple generator that controls conversion of an input voltage to an output voltage while maintaining a relatively constant switching frequency including a ripple capacitor and resistor, a transconductance amplifier circuit, an output error circuit, a frequency control circuit and a hysteretic comparator. The ripple capacitor and resistor develop a ripple voltage. The transconductance amplifier circuit switches, based on a PWM signal, between charging the ripple capacitor based on the input voltage and discharging the ripple capacitor based on the output voltage. The output error circuit provides a compensation voltage indicative of an error of the output voltage. The frequency control circuit develops a ripple window voltage relative to the compensation voltage to adjust switching frequency. The hysteretic comparator has a first input receiving the ripple voltage, a second input receiving the compensation voltage, a third input receiving the ripple window voltage, and an output providing the PWM signal.

20 Claims, 4 Drawing Sheets

US 7,145,317 B1

CONSTANT FREQUENCY DUTY CYCLE INDEPENDENT SYNTHETIC RIPPLE REGULATOR

CROSS-REFERENCE TO RELATED APPLICATIONS

This application claims the benefit of U.S. Provisional Application No. 60/635,690, filed on Dec. 13, 2004, which is herein incorporated by reference for all intents and purposes.

BACKGROUND OF THE INVENTION

1. Field of the Invention

The present invention relates to DC—DC converters, and more particularly to a constant frequency duty cycle independent synthetic ripple regulator.

2. Description of Related Art

A single-phase synthetic ripple DC—DC regulator was introduced in a patent application U.S. Ser. No. 10/236,787, filed Sep. 6, 2002, now issued as U.S. Pat. No. 6,791,306, issued Sep. 14, 2004. For the synthetic ripple regulator described therein, ripple current of an output inductor is simulated to generate a synthetic ripple voltage on a ripple capacitor. In general, the voltage applied to the inductor, or the voltage across the inductor, is converted to a current which is applied to a ripple capacitor. One end of the output inductor is coupled to a phase node between switching devices (e.g., FETs or the like) controlled by a pulse-width modulation (PWM) control circuit which switched the voltage of the phase node (by switching the switch devices) between the input voltage Vin and ground based on a PWM signal. The other end of the inductor is coupled to the output node developing the output voltage Vo. In an exemplary configuration, a transconductance circuit converts Vo to a discharge current used to continuously discharge the ripple capacitor and the transconductance circuit converts Vin to a charge current used to charge the ripple capacitor during a portion of each PWM cycle. Thus, the ripple capacitor is charged with gm·(Vin−Vo) current during the PWM ON cycle and discharged with gm·Vo current during the PWM OFF cycle (where a dot "·" denotes multiplication and where "gm" denotes transconductance). A related application, U.S. Ser. No. 10/853,733 filed May 25, 2004, described several variations of the basic synthetic ripple regulator theme.

In various applications, such as in mobile applications or the like (e.g., hand-held unit, laptop computer, etc.), the input voltage Vin has a relatively large range. As an example, in some configurations the input voltage ranges anywhere between 7 and 25 Volts (V), depending upon various factors such as connection of a battery or line voltage, charge condition of the battery, etc. The particular input voltage levels and allowable voltage ranges may vary depending upon the implementation and application. The output voltage may also change depending upon various modes of operation, such as a higher value when operating in a full power mode and a lower voltage value when operating in any one or multiple lower power modes. In one exemplary configuration, the battery voltage may range anywhere between 0.5V and 1V, although other voltage levels and ranges are contemplated. The synthetic ripple regulator provides many benefits and advantages when used for DC—DC regulation of electronic devices including mobile devices. It is noted, however, that the PWM DC frequency of operation of the DC—DC regulator is different with changes of Vin and/or Vo. Although it is acceptable and desirable that the PWM frequency change during load transients and the like, it is desired that the frequency remain relatively the same for each of various DC operating conditions in spite of changes in the input or output voltages.

SUMMARY OF THE INVENTION

A synthetic ripple generator that controls conversion of an input voltage to an output voltage while maintaining a relatively constant switching frequency according to an embodiment of the present invention includes a ripple capacitor, a ripple resistor, a transconductance amplifier circuit, an output error circuit, a frequency control circuit and a hysteretic comparator. The ripple capacitor develops a ripple voltage and the ripple resistor is coupled to the ripple capacitor. The transconductance amplifier circuit switches, based on a pulse width modulation (PWM) signal, between charging the ripple capacitor based on the input voltage and discharging the ripple capacitor based on the output voltage. The output error circuit has an output providing a compensation voltage indicative of an error of the output voltage. The frequency control circuit develops a ripple window voltage relative to the compensation voltage to adjust switching frequency. The hysteretic comparator has a first input receiving the ripple voltage, a second input receiving the compensation voltage, a third input receiving the ripple window voltage, and an output providing the PWM signal.

A voltage clamp may be coupled to the ripple capacitor to keep the ripple voltage within a predetermined range. The transconductance amplifier circuit may include first and second transconductance amplifiers and a switch circuit. The first transconductance amplifier has an input for receiving the input voltage and an output. The switch circuit has a first input coupled to the output of the first transconductance amplifier, a second input receiving the PWM signal, and an output coupled to the ripple capacitor. The second transconductance amplifier has an input for receiving the output voltage and an output coupled to the ripple capacitor. In this manner, the ripple capacitor is constantly discharged by the second transconductance amplifier based on the output voltage and is charged by the first transconductance amplifier based on the input voltage during the on portion of the PWM signal.

The output error circuit may include an error amplifier having a first input receiving a feedback signal indicative of the output voltage, a second input receiving a reference voltage, and an output providing the compensation voltage. The frequency control circuit may include a frequency set resistor and a current source. The frequency set resistor has a first end coupled to the output of the output error circuit and a second end that develops the window voltage and the current source has an output coupled to the second end of the resistor. In this case, the current source sources a current based on output voltage, input voltage, current through the ripple resistor, and duty cycle of the PWM signal. Alternatively, the frequency control circuit includes first and second current sources and a switch coupled to the frequency set resistor. The first current source has an output providing a current based on the output voltage and the second current source has an output providing a current based on current through the ripple resistor. The switch has a first switched terminal coupled to the outputs of the first and second current sources, a second switched terminal coupled to the second end of the frequency set resistor, and a control input receiving an inverted version of the PWM signal.

The hysteretic comparator may include first and second comparators and a latch. The first comparator has inputs receiving the compensation voltage and the ripple voltage and an output. The second comparator has inputs receiving the window voltage and the ripple voltage. The latch has a set input coupled to the output of the first comparator, a reset input coupled to the output of the second comparator, and an output providing the PWM signal.

A DC/DC regulator according to an embodiment of the present invention includes a switching circuit, an output inductor, an error circuit, a ripple capacitor, a ripple resistor, a transconductance amplifier circuit, a frequency control circuit, and a hysteretic comparator. The switching circuit alternately couples a phase node to opposite polarities of an input voltage based on a pulse width modulation (PWM) signal. The output inductor is coupled between the phase node and an output node that develops an output voltage. The error circuit has an input that senses the output voltage and an output coupled to a compensation node that develops a compensation voltage indicative of error of the output voltage. The ripple capacitor is coupled between a ripple node and ground and the ripple resistor is coupled to the ripple node. The transconductance amplifier circuit has a first input that receives the output voltage, a second input that receives the input voltage, and an output coupled to the ripple node for developing a ripple voltage on the ripple capacitor indicative of ripple current through the output inductor. The frequency control circuit develops a window voltage on a window node relative to the compensation voltage to maintain frequency of the PWM signal. The hysteretic comparator has a first input coupled to the ripple node, a second input coupled to the compensation node, a third input coupled to the window node, and an output that provides the PWM signal.

The frequency control circuit may include a frequency set resistor coupled between the compensation and window nodes, and a current source circuit that provides controlled current to the window node. The controlled current is adjusted to compensate for changes of frequency of the PWM signal. The current source circuit may include a current source which sources the controlled current based on the output voltage, the input voltage, current through the ripple resistor, and duty cycle of the PWM signal. Alternatively, the current source circuit includes first and second current sources, an inverter, and a switch. In the latter case, the first current source has an output providing a first current based on the output voltage and the second current source has an output providing a second current based on current through the ripple resistor. The inverter has an input receiving the PWM signal and an output providing an inverted PWM signal. The switch has an input coupled to the outputs of the first and second current sources, an output coupled to the window node, and a control input receiving the inverted PWM signal.

A method of maintaining constant frequency of a DC/DC regulator which switches an input voltage via a phase node through an output inductor to develop an output voltage at an output node based on a PWM signal according to an embodiment of the present invention includes generating a ripple voltage across a ripple capacitor and a ripple resistor representing ripple current through the output inductor, generating a compensation voltage indicative of error of the output voltage, comparing the ripple voltage within a voltage window between the compensation voltage and a control voltage to provide the PWM signal, and developing the control voltage relative to the compensation voltage based on the output voltage, current through the ripple current, and duty cycle of the PWM signal to maintain constant frequency of the PWM signal.

The method may include discharging the ripple capacitor based on the output voltage and charging the ripple capacitor based on the input voltage and the PWM signal. The method may include comparing an output voltage sense signal with a predetermined reference voltage. The method may include providing a control current to the window node that is based on the output voltage, the duty cycle of the PWM signal, and the current through the ripple resistor. The method may include providing a first current based on the output voltage, providing a second current based on the current through the ripple resistor, and selectively providing the first current and the second current to the window node based on the PWM signal.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
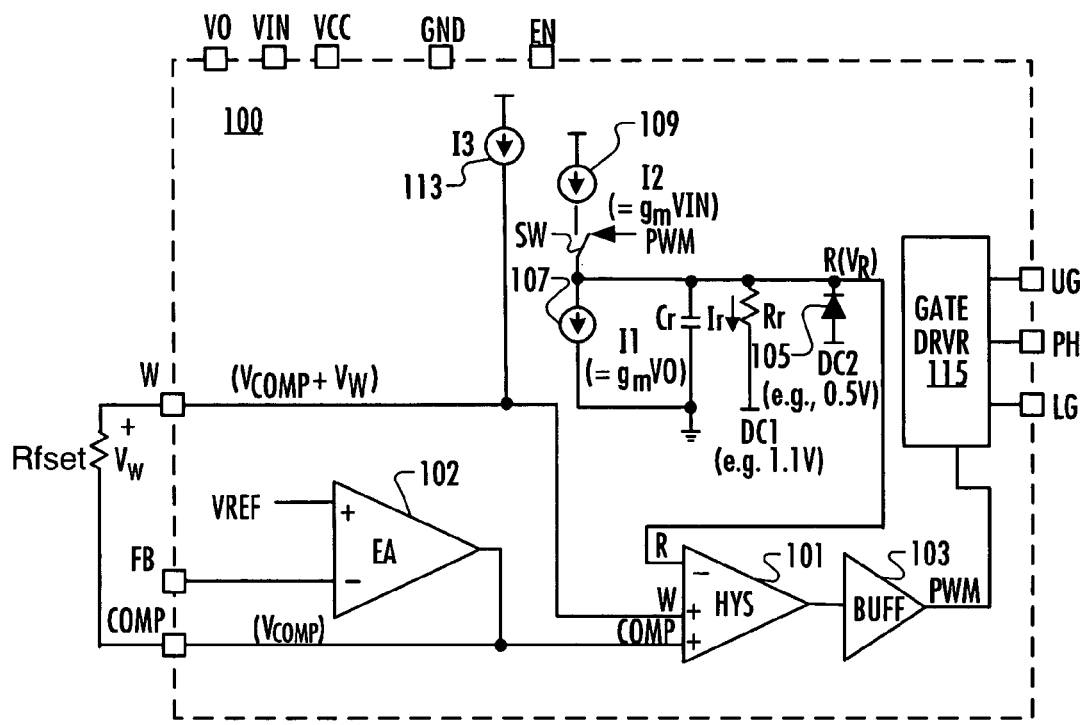
FIG. 1 is a block diagram of a constant frequency duty cycle independent synthetic ripple regulator implemented according to an embodiment of the present invention.

FIG. 1 is a block diagram of a constant frequency duty cycle independent synthetic ripple regulator controller 100 implemented according to an embodiment of the present invention. The controller 100 is implemented on a chip or integrated circuit (IC), although discrete embodiments are contemplated as well. As illustrated, the controller 100 is implemented on an IC having input/output (I/O) pins illustrated with squares labeled with the corresponding pin name. The pin name corresponds with the signal name or node name and indicates its function. As illustrated, VO is an output voltage pin with voltage VO, VIN is an input voltage pin with voltage VIN, VCC is the supply voltage pin with voltage VCC, GND is the ground pin, EN is the chip enable pin input, COMP is the compensation pin with voltage VCOMP, W is a window voltage pin having a voltage VCOMP+$V_W$ in which VW is a window voltage, and FB is a feedback pin receiving a feedback signal indicative of an output of the power converter. A node assumes the same name as the signal it carries unless otherwise specified. The voltage of each node is the same as the signal name unless otherwise specified in parenthesis.

As shown in FIG. 1, an error amplifier (EA) 102 receives a reference voltage VREF at its positive or non-inverting input (+) and has its negative or inverting input (−) coupled to the FB pin. The output of EA 102 generates the compensation signal COMP provided to a first non-inverting input of a hysteretic (HYS) comparator 101. The output of the hysteretic comparator 101 is coupled to an input of a buffer (BUFF) 103 providing a pulse width modulation (PWM) signal to an input of a gate driver circuit 115. The gate driver circuit 115 provides an upper gate drive signal UG, a lower gate drive signal LG, and is coupled to a phase node (PH) as further described below. A ripple capacitor Cr is coupled between a ripple node R and ground. A ripple resistor Rr is coupled between node R and a constant voltage node DC1. A voltage clamp 105 has its cathode coupled to node R and its anode coupled to another constant voltage node DC2. In one embodiment, DC1 is approximately 1.1 Volts (V) and DC2 is approximately 0.5V, where the specific DC voltages are exemplary only and may be different for different configurations. The node R develops a ripple voltage $V_R$ relative to ground and is provided to an inverting input (−) of the hysteretic comparator 101. The ripple resistor Rr and the voltage clamp 105 are added to prevent the voltage $V_R$ of node R from rising to a level that would saturate the ripple capacitor Cr. Current through the ripple resistor Rr, shown as Ir, is added during charge and discharge cycles so that the voltage $V_R$ across the ripple capacitor Cr stays within a predetermined operating range.

A current source 107 is coupled between node R and ground and develops a discharge current I1=gm·VO in which "gm" is transconductance, a dot "·" denotes multiplication, and VO is the output voltage on the VO pin. The transconductance gm is a conversion factor between input voltage and output current as further described below. The current I1 developed by the current source 107 constantly discharges the capacitor Cr in the illustrated embodiment. Another current source 109 is coupled between VIN and a first switched terminal of a single-pole, double throw (SPST) switch SW having a control input receiving the PWM signal. The other switched terminal of the switch SW is coupled to node R. The current source 109 develops a charge current I2=gm·VIN in which VIN is the input voltage of the pin VIN. The current source 109 charges the capacitor Cr when the switch SW is closed as controlled by the PWM signal. Thus, the capacitor Cr is charged with a current gm·(VIN−VO)−Ir during each PWM ON cycle (when PWM is high closing the switch SW) and is discharged with a current gm·VO+Ir during each PWM off cycle (when PWM is low opening the switch SW).

An external frequency set resistor Rfset is coupled between the W and COMP pins and develops the window voltage $V_W$ between the W and COMP pins. The window voltage $V_W$ is thus added to the voltage $V_{COMP}$ of the COMP pin, so that a voltage $V_{COMP}=V_W$ develops on the W pin which is coupled to a second non-inverting (+) input of the hysteretic comparator 101. The voltage $V_W$ is a control voltage which defines the window voltage of operation between voltages $V_{COMP}$ and $V_{COMP}+V_W$ for the ripple voltage $V_R$. A current source 113 develops a frequency control current I3, defined below, which is provided to the resistor Rfset via the W pin or node.

Figure 2:
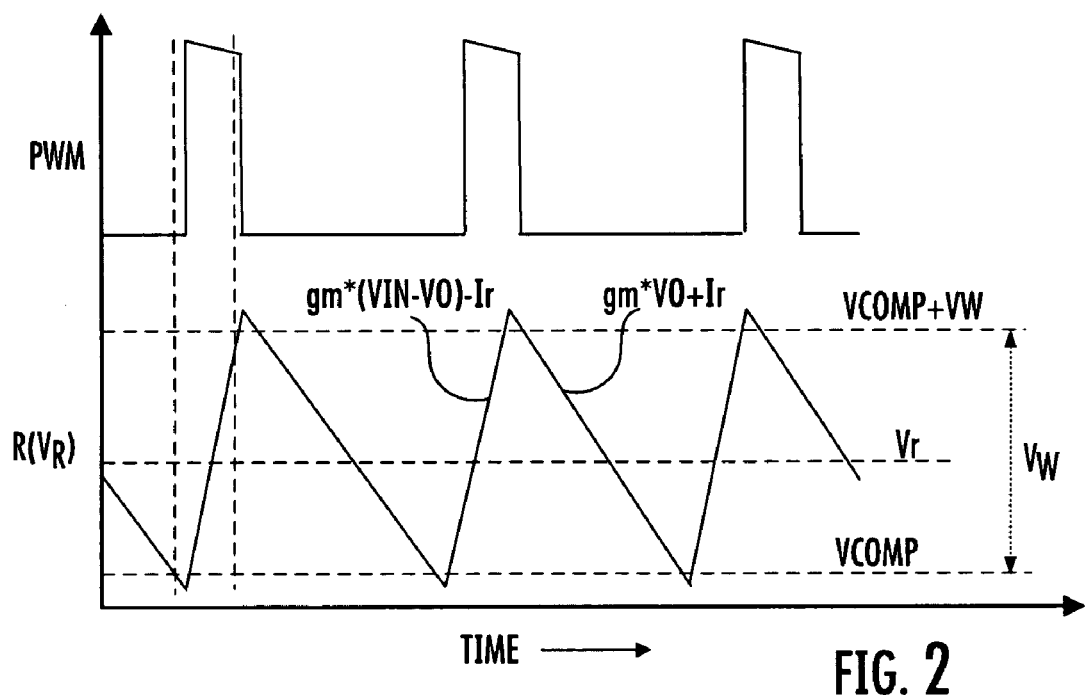
FIG. 2 is a graphic diagram of the ripple waveform at the input of the hysteretic comparator of FIG. 1.

FIG. 2 is a graph diagram plotting the PWM and R signals versus time in which the ripple signal is the same as the $V_R$ voltage. The R signal varies between the voltage of COMP, or $V_{COMP}$, and $V_{COMP}$ added to the voltage of $V_W$, or $V_{COMP}+V_W$. A voltage Vr is shown representing the average ripple voltage. From FIG. 2, the switching period (Ts) is written according to the following equation (1):

$$T_s = \frac{Cr \cdot Vw}{gm \cdot (VIN - VO) - Ir} + \frac{Cr \cdot Vw}{gm \cdot VO + Ir} \tag{1}$$

where, Cr is the capacitance of the ripple capacitor, $V_w$ is the window voltage, Ir is the current through ripple resistor Rr, gm is transconductance, VIN is the input voltage, and VO is the output voltage. Frequency (Freq), which is 1/Ts, is then derived from equation (1) according to the following equation (2):

$$Freq = \frac{(gm \cdot VO + Ir)\left(1 - Do - \frac{Ir}{gm \cdot VIN}\right)}{Cr \cdot Vw} \tag{2}$$

where $D_O$ is the duty cycle equal to VO/VIN. In a typical configuration, $D_O$ is relatively small, such as about 0.1 or less. In one embodiment, the ripple voltage $V_R$ is on the order of 100 millivolts (mV) and the ripple resistor Rr has a resistance value of about 800 kilo-ohms (KΩ), so that Ir is relatively small. Also, the value gm·VIN is on the order of about 10 microamperes (µA), so that the value Ir/(gm·VIN) becomes negligible during stable frequency operation (e.g., DC conditions) and may be ignored.

In the embodiment illustrated, the window voltage $V_W$ is chosen according to the following equation (3):

$$V_W = K_{tr} R_{fset} \{(g_m \cdot VO + I_r)[1 - D_O - (I_r/g_m \cdot V_{IN})]\} \tag{3}$$

where Rfset is the resistance of the frequency set resistor Rfst and $K_{tr}$ is a gain constant. The value inside the brackets "{ }" from equation (3) is chosen as the control current I3 sourced by the current source 113 and provided to the resistor Rfset via the W pin. Then, frequency is given by the following equation (4):

$$Freq = \frac{1}{K_{tr} \cdot R_{fset} \cdot C_r} \tag{4}$$

Equation (4) illustrates that DC operating frequency (freq) is a simple function of the value Rfset·Cr, and can be set by choosing Rfset and Cr, or by selecting Rfset based on a known capacitance value of Cr (such as when it is internal to an IC). Equation (4) also illustrates that: 1) frequency is constant over vast input voltage and output voltage ranges of VIN and VO, respectively; and 2) frequency is independent of duty cycle $D_O$. In this manner, the frequency of operation during normal stable conditions is the same regardless of the input voltage VIN and the output voltage VO and is independent of the duty cycle $D_O$. Although the frequency may temporarily change during transient conditions (e.g., load changes or voltage changes), the frequency returns to the same value as the circuit stabilizes.

Figure 3:
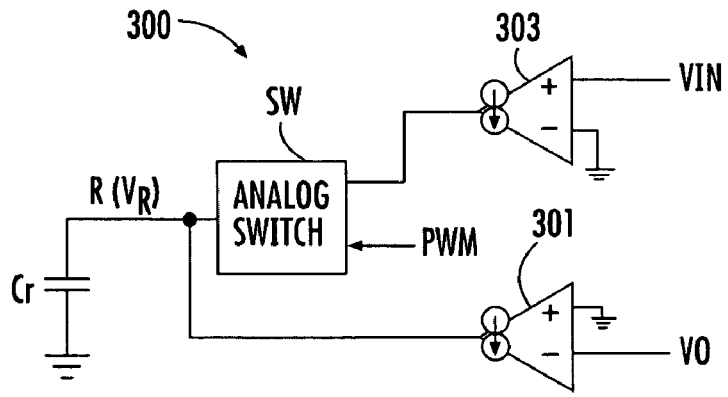
FIG. 3 is a schematic diagram of an exemplary transconductor amplifier circuit which may be used to implement the current sources and the switch of FIG. 1.

FIG. 3 is a schematic diagram of an exemplary transconductor amplifier circuit 300 which may be used to implement the current sources 107 and 109 and the switch SW. The current source 107 is implemented with a transconductor amplifier 301 having is non-inverting input coupled to ground, its inverting input receiving the output voltage VO and its output coupled to the ripple node R. The current source 109 is implemented with another transconductor amplifier 303 having is inverting input coupled to ground, its non-inverting input receiving the input voltage VIN and its output coupled to an input of the switch SW. The output of the switch SW is coupled to the ripple node R. In the embodiment illustrated, the switch SW is implemented as an analog switch, although other types of switches are contemplated. The transconductance of the transconductor amplifiers 301 and 303 are assumed to be equal to gm.

Figure 4:
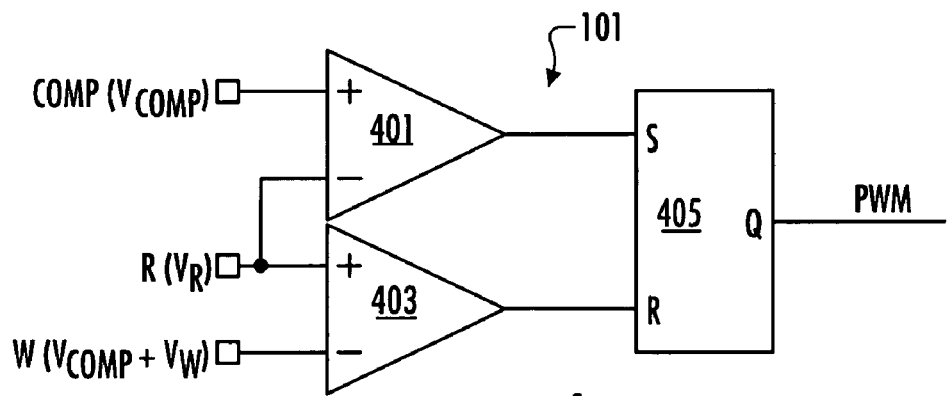
FIG. 4 is a schematic diagram of the hysteretic comparator implemented according to an exemplary embodiment of the present invention.

FIG. 4 is a schematic diagram of the hysteretic comparator 101 implemented according to an exemplary embodiment of the present invention. A first comparator 401 has its non-inverting input coupled to the COMP pin for receiving the $V_{COMP}$ voltage, its inverting input coupled to the node R for receiving the ripple voltage $V_R$, and its output coupled to the set input of a set-reset flip flop or SR latch 405. A second comparator 403 has its inverting input coupled to the W pin for receiving the window or control voltage $V_{COMP}+V_W$, its non-inverting input coupled to the node R for receiving the ripple voltage $V_R$, and its output coupled to the reset input of the SR latch 405. The Q output of the latch provides the PWM signal.

Figure 5:
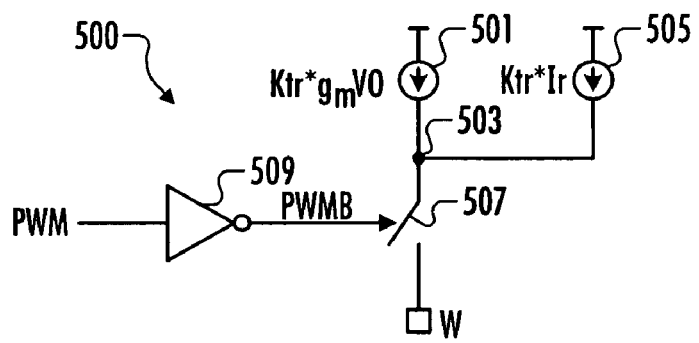
FIG. 5 is a schematic diagram of a current control circuit implemented according to an alternative embodiment of the present invention for replacing the frequency control current source of FIG. 1.

FIG. 5 is a schematic diagram of a current control circuit 500 implemented according to an alternative embodiment of the present invention for replacing the current source 113. In this case, a first current source 501 sources a current of Ktr*gmVO to a node 503 and another current source 505 sources a current Ktr*Ir to the node 503. The node 503 is coupled to one switched terminal (or input terminal) of a SPST switch 507, having its other switched terminal (or output terminal) coupled to the W pin for developing the voltage $V_{COMP}+V_W$. The PWM signal is provided to the input of an inverter 509, having its output providing an inverted version of the PWM signal, or PWMB, to the control input of the switch 507. In this case, with reference to equation 3, the term Ir/gmVIN is determined to be much smaller than the term 1–$D_O$, so that the term Ir/gmVIN is ignored. Thus, the current provided to the the resistor Rfset via the W pin is Ifset=Ktr(gmVO+Ir)(1–$D_O$).

Figure 6:
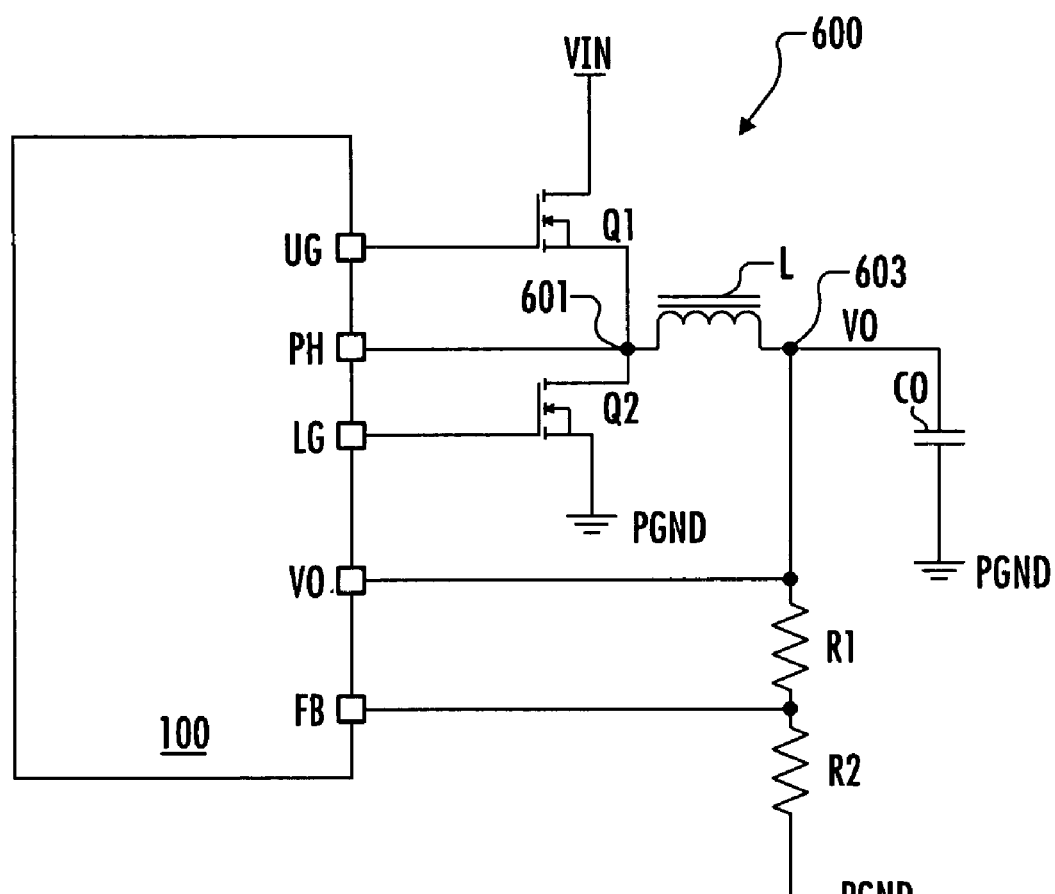
FIG. 6 is a simplified schematic diagram of a DC/DC regulator using the controller of FIG. 1 according to an exemplary embodiment of the present invention.

FIG. 6 is a simplified schematic diagram of a DC/DC regulator 600 using the controller 100 according to an exemplary embodiment of the present invention. The input voltage VIN is provided to the drain of a first N-channel metal-oxide semiconductor field-effect transistor (MOSFET) Q1, having its source coupled to a phase node 601. The UG pin of the controller 100 drives the gate of Q1. The drain of another MOSFET Q2 is coupled to the phase node 601 and its source is coupled to power ground PGND. The LG pin of the controller 100 drives the gate of Q2. The phase node is coupled to the PH pin of the controller 100, and to one end of an output inductor L. The other end of the inductor L is coupled to an output node 603, which is coupled to one end of an output capacitor CO having its other end coupled to PGND. The output node 603 develops the output voltage VO and is coupled to one end of a sense resistor R1 and to the VO pin of the controller 100. The other end of the resistor R1 is coupled to one end of another sense resistor R2 and to the FB pin of the controller 100. The other end of the resistor R2 is coupled to PGND.

The controller 100 turns Q1 on during the on portion of each cycle of the PWM signal, and then turns Q1 off and Q2 on during the remaining off portion as understood by those skilled in the art. In this manner, the phase node 601 at the input end of the inductor L is effectively switched between the opposite polarities of the VIN signal. In other words, when Q1 is on (and Q2 is off), the inductor L is coupled to VIN via Q1 and when Q2 is (and Q1 is off), the inductor is coupled to PGND (although the phase node 601 may drop below ground in particular configurations). The switching of Q1 and Q2 causes a ripple current through the inductor L. The switching of the switch SW for selectively charging and discharging the ripple capacitor Cr based on the PWM signal and the input voltage VIN and output voltage VO causes a ripple voltage on node R which effectively replicates the ripple current through the inductor L.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A synthetic ripple generator that controls conversion of an input voltage to an output voltage while maintaining a relatively constant switching frequency, comprising:
    a ripple capacitor which develops a ripple voltage;
    a ripple resistor coupled to said ripple capacitor;
    a transconductance amplifier circuit that switches, based on a pulse width modulation (PWM) signal, between charging said ripple capacitor based on the input voltage and discharging said ripple capacitor based on the output voltage;
    an output error circuit having an output providing a compensation voltage indicative of an error of the output voltage;
    a frequency control circuit which develops a ripple window voltage relative to said compensation voltage to adjust switching frequency; and
    a hysteretic comparator having a first input receiving said ripple voltage, a second input receiving said compensation voltage, a third input receiving said ripple window voltage, and an output providing said PWM signal.

2. The synthetic ripple generator of claim 1, further comprising a voltage clamp coupled to said ripple capacitor.

3. The synthetic ripple generator of claim 1, wherein said transconductance amplifier circuit comprises:
    a first transconductance amplifier having an input for receiving the input voltage and an output;
    a switch circuit having a first input coupled to said output of said first transconductance amplifier, a second input receiving said PWM signal, and an output coupled to said ripple capacitor; and
    a second transconductance amplifier having an input for receiving the output voltage and an output coupled to said ripple capacitor.

4. The synthetic ripple generator of claim 1, wherein said output error circuit comprises an error amplifier having a first input receiving a feedback signal indicative of the output voltage, a second input receiving a reference voltage, and an output providing said compensation voltage.

5. The synthetic ripple generator of claim 1, wherein said frequency control circuit comprises:
    a frequency set resistor having a first end coupled to said output of said output error circuit and a second end that develops said window voltage; and a current source having an output coupled to said second end of said resistor, wherein said current source sources a current based on output voltage, input voltage, current through said ripple resistor, and duty cycle of said PWM signal.

6. The synthetic ripple generator of claim 1, wherein said frequency control circuit comprises:
   a frequency set resistor having a first end coupled to said output of said output error circuit and a second end that develops said window voltage;
   a first current source having an output providing a current based on the output voltage;
   a second current source having an output providing a current based on current through said ripple resistor; and
   a switch having a first switched terminal coupled to said outputs of said first and second current sources, a second switched terminal coupled to said second end of said frequency set resistor, and a control input receiving an inverted version of said PWM signal.

7. The synthetic ripple generator of claim 1, wherein said hysteretic comparator comprises:
   a first comparator having inputs receiving said compensation voltage and said ripple voltage and an output;
   a second comparator having inputs receiving said window voltage and said ripple voltage; and
   a latch having a set input coupled to said output of said first comparator, a reset input coupled to said output of said second comparator, and an output providing said PWM signal.

8. A DC/DC regulator, comprising:
   a switching circuit that alternately couples a phase node to opposite polarities of an input voltage based on a pulse width modulation (PWM) signal;
   an output inductor coupled between said phase node and an output node that develops an output voltage;
   an error circuit having an input that senses said output voltage and an output coupled to a compensation node that develops a compensation voltage indicative of error of said output voltage;
   a ripple capacitor coupled between a ripple node and ground;
   a ripple resistor coupled to said ripple node;
   a transconductance amplifier circuit having a first input that receives said output voltage, a second input that receives said input voltage, and an output coupled to said ripple node for developing a ripple voltage on said ripple capacitor indicative of ripple current through said output inductor;
   a frequency control circuit which develops a window voltage on a window node relative to said compensation voltage to maintain frequency of said PWM signal; and
   a hysteretic comparator having a first input coupled to said ripple node, a second input coupled to said compensation node, a third input coupled to said window node, and an output that provides said PWM signal.

9. The DC/DC regulator of claim 8, wherein said ripple resistor is coupled between a DC voltage and said ripple node.

10. The DC/DC regulator of claim 8, further comprising a voltage clamp coupled to said ripple node.

11. The DC/DC regulator of claim 8, wherein said a transconductance amplifier circuit comprises:
   a first transconductance amplifier having an input receiving said input voltage and an output;
   a switch circuit having a first input coupled to said output of said first transconductance amplifier, a second input receiving said PWM signal, and an output coupled to said ripple node; and
   a second transconductance amplifier having an input receiving said output voltage and an output coupled to said ripple node.

12. The DC/DC regulator of claim 8, wherein said frequency control circuit comprises:
   a frequency set resistor coupled between said compensation and window nodes; and
   a current source circuit that provides controlled current to said window node, wherein said controlled current is adjusted to compensate for changes of frequency of said PWM signal.

13. The DC/DC regulator of claim 12, wherein said current source circuit comprises a current source which sources said controlled current based on said output voltage, said input voltage, current through said ripple resistor and duty cycle of said PWM signal.

14. The DC/DC regulator of claim 12, wherein said current source circuit comprises:
   a first current source having an output providing a first current based on said output voltage;
   a second current source having an output providing a second current based on current through said ripple resistor;
   an inverter having an input receiving said PWM signal and an output providing an inverted PWM signal; and
   a switch having an input coupled to said outputs of said first and second current sources, an output coupled to said window node, and a control input receiving said inverted PWM signal.

15. The DC/DC regulator of claim 8, wherein said hysteretic comparator comprises:
   a first comparator having a first input coupled to said compensation node, a second input coupled to said ripple node, and an output;
   a second comparator having a first input coupled to said window node, a second input coupled to said ripple node, and an output; and
   set-reset logic having a set input coupled to said output of said first comparator, a reset input coupled to said output of said second comparator, and an output providing said PWM signal.

16. A method of maintaining constant frequency of a DC/DC regulator which switches an input voltage via a phase node through an output inductor to develop an output voltage at an output node based on a pulse width modulation (PWM) signal, said method comprising:
   generating a ripple voltage across a ripple capacitor and a ripple resistor representing ripple current through the output inductor;
   generating a compensation voltage indicative of error of the output voltage;
   comparing the ripple voltage within a voltage window between the compensation voltage and a control voltage to provide the PWM signal; and
   developing the control voltage relative to the compensation voltage based on the output voltage, current through the ripple current, and duty cycle of the PWM signal to maintain constant frequency of the PWM signal.

17. The method of claim 16, wherein said generating a ripple voltage comprises discharging the ripple capacitor based on the output voltage and charging the ripple capacitor based on the input voltage and the PWM signal.

18. The method of claim 16, wherein said generating a compensation voltage comprises comparing an output voltage sense signal with a predetermined reference voltage.

19. The method of claim 16, wherein said developing the control window voltage comprises providing a control current to the window node that is based on the output voltage, the duty cycle of the PWM signal, and the current through the ripple resistor.

20. The method of claim 16, wherein said developing the control window voltage comprises:

providing a first current based on the output voltage;

providing a second current based on the current through the ripple resistor; and selectively providing the first current and the second current to the window node based on the PWM signal.

* * * * *